Dec. 29, 1936.  C. L. BAUSCH  2,065,502
OPHTHALMIC LENS AND METHOD OF MAKING SAME
Filed Dec. 16, 1935

CARL L. BAUSCH
INVENTOR
BY
ATTORNEYS

Patented Dec. 29, 1936

2,065,502

UNITED STATES PATENT OFFICE 2,065,502

OPHTHALMIC LENS AND METHOD OF MAKING SAME

Carl L. Bausch, Rochester, N. Y., assignor to Bausch & Lomb Optical Company, Rochester, N. Y., a corporation of New York Application December 16, 1935, Serial No. 54,609

5 Claims. (Cl. 88—54)

The present invention relates to ophthalmic lenses and more particularly to absorptive ophthalmic lenses.

The advantages and desirability of absorptive ophthalmic lenses are well known and it is also well known that it is desirable to increase the absorptive properties toward the edge of the lens and thus decrease the indirect or peripheral glare. Both of these features are known and each has been separately incorporated in an ophthalmic lens but as yet no one has been able to incorporate both features in a single lens.

One of the objects of the present invention is to provide an ophthalmic lens having a central zone of uniform absorption and a peripheral zone in which the absorption increases gradually toward the edge of the lens. Another object is to provide a method of making such a lens. These and other objects and advantages reside in certain novel features of construction, arrangement and combination of parts and processes as will hereinafter be more fully set forth and pointed out in the appended claims.

Referring to the drawing.

Figure 1:
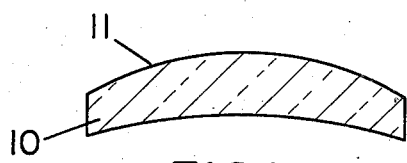
Fig. 1 is a section of a piece of glass having a convex surface.
Figure 2:
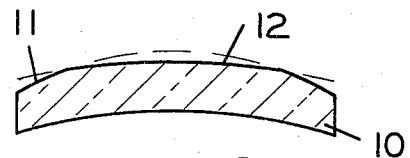
Fig. 2 is a section of same after a central zone of long radius of curvature has been formed on the convex surface.

One embodiment of the present invention is illustrated in the drawing wherein 10 indicates a piece of glass upon which a convex surface 11 of relatively short radius of curvature is ground and polished. A central zone 12, having a longer radius of curvature than the surface 11, is then ground and polished on the convex side of the piece of glass 10 as illustrated in Fig. 2.

Figure 3:
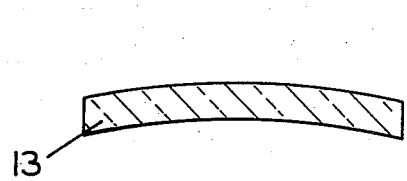
Fig. 3 is a section of a piece of absorptive glass.
Figure 4:
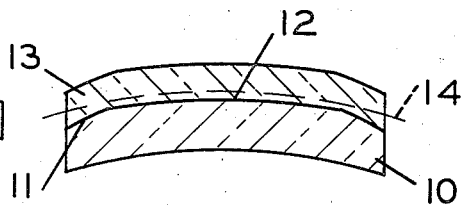
Fig. 4 is a section of a composite blank.

Fig. 3 shows a piece of absorptive glass 13 which is fused to the convex side of the piece of glass 10 so that it conforms to both the central zone 12 and the peripheral zone formed by the surface 11 beyond the central zone 12. The composite blank so formed is shown in Fig. 4. The absorptive glass 13 is then ground away along a curve 14 which is substantially parallel to the central zone 12.

Figure 5:
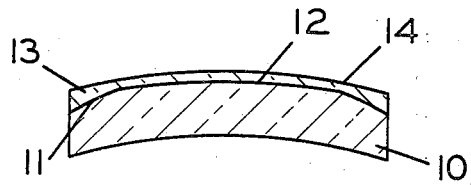
Fig. 5 is a section of the composite blank after the excess absorptive glass has been removed.

The semi-finished lens blank is shown in Fig. 5 and it can be seen that the absorptive glass 13 is of uniform thickness across the central zone 12, while in the peripheral zone, the thickness of the absorptive glass 13 increases toward the edge of the lens blank. While only the glass 13 has been referred to as an absorptive glass, the piece of glass 10 may be either clear or absorptive but it should have a higher transmission than the glass 13. By the term absorptive glass is meant any tinted glass or any glass in which the transmission is less than the transmission of clear glass.

From the foregoing it will be apparent that I am able to attain the objects of my invention and provide an ophthalmic lens having a central zone of uniform absorption and a peripheral zone in which the absorption increases toward the edge of the lens. While in the description of the making of this improved lens, the surface 11 forming the peripheral zone is formed first, it is obviously immaterial which zone is formed first and the piece 10 could be first ground to the curvature of the zone 12 and the edges ground away along the surface 11. It is also to be understood that the two zones could be formed otherwise than by grinding. That is, the piece of glass as shown in Fig. 2 could also be molded or otherwise suitably formed. Various other modifications can, of course, be made without departing from the spirit of my invention or the scope of the appended claims.

I claim:

1. An ophthalmic lens comprising a blank of clear glass and a coextensive blank of absorptive glass secured in superposed relation thereto, said blank of absorptive glass having a central zone of uniform thickness and a peripheral zone in which the thickness increases toward the edge.

2. An ophthalmic lens comprising two substantially coextensive pieces of glass of different light transmission secured together in superposed relation, said lens having a central zone of uniform transmission lower than the transmission of an equal thickness of the glass of the higher transmission and, having a peripheral zone in which the transmission decreases toward the edge of the lens.

3. The method of making an ophthalmic lens which comprises forming a blank of glass with a surface having a curved central zone and a more steeply curved peripheral zone, securing a blank of absorptive glass to said surface in conformity therewith, and removing a part of said absorptive glass along a surface parallel to the surface of said central zone.

4. The method of making an ophthalmic lens blank which comprises forming on a piece of glass a convex surface having a central zone of one radius of curvature and a peripheral zone of a less radius of curvature, fixing to said convex surface in conformity therewith a substantially coextensive piece of glass of lower light transmission and removing a part of the last-mentioned piece of glass along a surface having a radius of curvature equal to the first-mentioned radius of curvature.

5. The method of making an ophthalmic lens blank which comprises forming a piece of glass with a convex surface, forming on the central portion of said surface a zone having a longer radius of curvature than said convex surface, fusing across said surface and said zone a second piece of glass having a lower transmission than that of the first-mentioned piece of glass, and grinding away said second piece of glass along a surface parallel to said central zone.

CARL L. BAUSCH.